No. 686,667. Patented Nov. 12, 1901.
H. B. WATERS.
BUTTER CUTTER.
(Application filed Sept. 18, 1900.)

(No Model.)

Witnesses
Inventor,
Harry B. Waters,
By
Attorney.

THE NORRIS PETERS CO., PHOTO-LITHO., WASHINGTON, D. C.

UNITED STATES PATENT OFFICE.

HARRY B. WATERS, OF DENVER, COLORADO.

BUTTER-CUTTER.

SPECIFICATION forming part of Letters Patent No. 686,667, dated November 12, 1901.

Application filed September 18, 1900. Serial No. 30,445. (No model.)

*To all whom it may concern:*

Be it known that I, HARRY B. WATERS, a citizen of the United States of America, residing at Denver, in the county of Arapahoe and State of Colorado, have invented certain new and useful Improvements in Butter-Cutters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in butter-cutters specially adapted for use in restaurants, hotels, and boarding-houses, where considerable quantities of butter are required to be cut in small cakes or pieces for individual use.

My object is to provide a device whereby a package of butter containing one or more pounds may be quickly and easily cut into the required number of pieces. By the use of my improved device this is accomplished by two plungers or followers, which are moved successively at right angles to each other, whereby the package of butter is first divided into a number of pieces by forcing it through cutting devices and afterward subdivided by forcing it through cutters which cross the divisions or cuts made by the first set of cutters. The last-acting plunger forces the butter from the machine.

The invention will now be described in detail, reference being made to the accompanying drawings, in which is illustrated an embodiment thereof.

Figure 1:
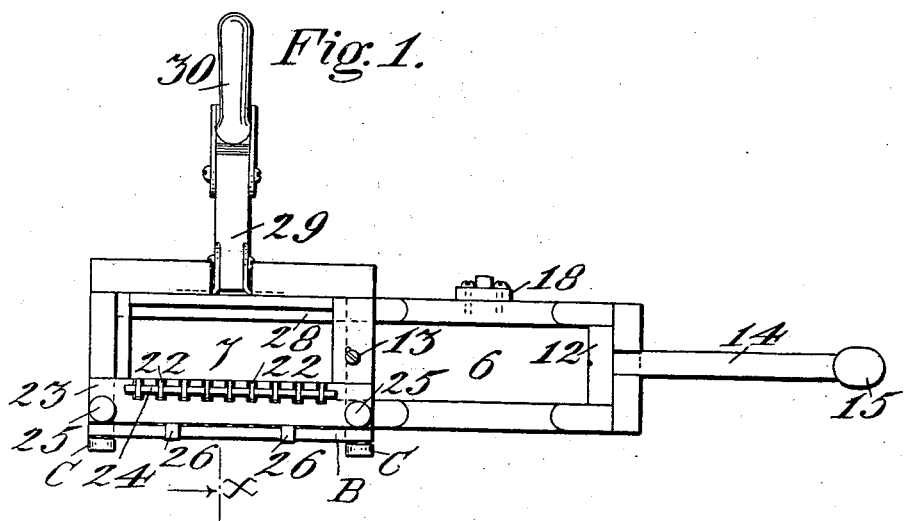
Figure 2:
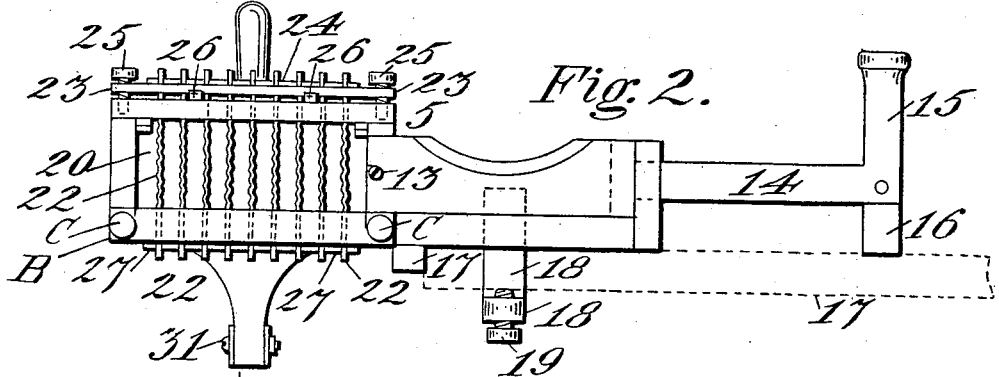
Figure 3:
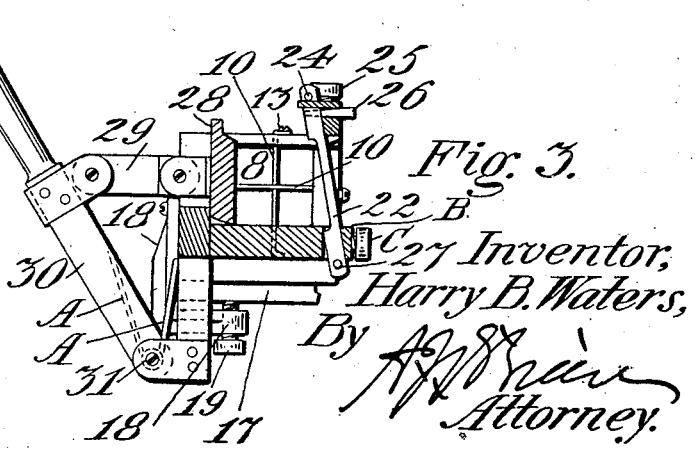

In the drawings, Figure 1 is a top or plan view of my improved device. Fig. 2 is a side elevation of the same. Fig. 3 is a section taken on the line $x\ x$, Fig. 2.

The same reference characters indicate the same parts in all the views.

Let the numeral 5 designate a casing inclosing two compartments 6 and 7. Each of these compartments is adapted to hold a package of butter of any desired or convenient size. As butter is usually put up in pound cakes or packages, a machine constructed to cut a pound at a time will undoubtedly be the more common size, though it will be understood that it may be made to cut cakes of any size.

Stretched across the opening 8 between the two compartments 6 and 7 are two cutting wires or knives 10, crossed at right angles to each other. When the package of butter is placed in the compartment 6, one of its ends lies adjacent these cutting wires or knives, while a plunger 12, movable in the compartment 6, occupies a position adjacent the opposite end of the butter package. The cutters 10 are preferably formed of wires, which are anchored at one extremity in the casing, while their opposite extremities are connected with screws 13. By turning these screws the cutting-wires may be maintained at the desired tension. The plunger 12 is connected with a stem 14, whose outer extremity is provided with an upwardly-projecting hand-piece 15 and a supporting-leg 16, adapted to engage the table 17 or other support to which the device is attached.

To the casing 5 is attached a bracket 18, adapted to extend below and pass under the edge of the table-top. This bracket is provided with a threaded opening, in which is inserted a thumb-bolt 19, arranged to be screwed against the table to hold the device in place.

The casing-compartment 7 is open on one side, as shown at 20. Arranged up and down across this opening and preferably occupying a position slightly inclined are cutters 22, which may consist of either wires or knives. The lower extremities of these cutters occupy slots formed in the base of the compartment, while their upper extremities engage slots formed in a plate 23 and are provided with a registering opening, through which is passed a pin 24. The plate 23 is held in place by screws 25, which pass through plain openings formed in the plate and are screwed into the casing underneath. The tension of the knives or cutters may be regulated by means of wedges 26, inserted between the plate and the casing. The lower extremities of the knives are held in place by a plate B in front, secured by screws C. This plate closes the extremities of the slots in which the lower ends of the knives are inserted and is inclined on its face to accommodate the knives. A pin 27 is passed through registering openings formed in the knife extremities below the bottom of the casing and locks them against upward movement. In Fig. 2 the knives are shown scalloped laterally or fashioned to give the butter pieces a fancy or ornamental appearance. It is evident that the design or shape of the knives in this regard is immaterial.

At one side of the compartment 7 is normally located a plunger 28, which is connected, by means of a link 29, with a lever 30, fulcrumed below the casing, as shown at 31. After the package of butter has been forced by the plunger 12 from the compartment 6 into the compartment 7 and divided into four parts by the cutters 10 it occupies a position with one of its longer sides adjacent the plunger 28. The operator by means of the lever 30 drives the plunger against the butter, whereby the latter is forced against the cutters 22 and out of the compartment, being thus subdivided to form forty pieces, as there are four cutters 10 and nine cutters 22. It is evident that the machine may be arranged to cut the butter cake into any desired number of pieces. By reason of the inclination of the cutters 22, whereby their upper extremities are innermost, as the butter is forced from the cutters by the plunger 28 it will leave the lower extremities of the cutters last as it is ejected from the machine. In other words, the rear face of the cake of butter will occupy a vertical position, and before this face of the butter passes the lower extremities of the cutters 22 it will be disengaged from the knives or cutters above their lower extremities. Hence there will be no tendency for the butter cake to stick to the cutters, with the result that it will drop immediately from the machine of its own accord as soon as the plunger 28 has reached its forward limit of movement. The plunger is pivotally connected with the link 28, and hence it will be able to assume an inclined position to accommodate itself to the inclination of the cutters 22 as the butter is finally ejected from the machine. A spring A is coiled around the fulcrum-pin of the lever 30. One extremity of this spring bears against the casing, while the other extremity engages the lever above the fulcrum. Hence as soon as the lever has been released after moving to its forward limit of movement the recoil of this spring will return the lever and its plunger 28 to their normal positions.

Having thus described my invention, what I claim is—

1. In a butter-cutter the combination with a suitable casing inclosing two compartments, of a set of cutters separating the compartments, and another set of cutters arranged along an opening in the side of one compartment, the last-named set of cutters occupying an inclined position, their upper extremities being innermost, a plunger arranged to force a package of butter from one compartment to the other through the intervening cutters, a lever, and another plunger pivotally connected therewith and arranged to force the butter out of the second compartment through the inclined set of cutters, the arrangement being such that the two sets of cutters act on the package at right angles to each other.

2. In a butter-cutter the combination with a casing inclosing two compartments, two plungers arranged to operate at right angles to each other in their respective compartments, cutters through which the butter is forced from one compartment to the other by one plunger, operating means with which the other plunger is pivotally connected, and other cutters through which the butter is ejected from the machine by the last-named plunger, the last-named set of cutters occupying an inclined position, their upper extremities being innermost.

3. In a butter-cutter the combination with a casing inclosing a butter-compartment open on one side, inclined cutters arranged along said opening, their upper extremities being innermost, a plunger located in the said compartment, and means for operating the plunger with which the latter is pivotally connected.

4. In a butter-cutter the combination with a casing inclosing a butter-compartment open on one side, inclined cutters arranged along said opening, their upper extremities being innermost, a plunger located in the said compartment, and a spring-retained operating-lever with which the plunger is pivotally connected.

In testimony whereof I affix my signature in presence of two witnesses.

HARRY B. WATERS.

Witnesses:
DORA C. SHICK,
MARY C. LAMB.